United States Patent [19]
Jacobs

[11] Patent Number: 5,194,487
[45] Date of Patent: Mar. 16, 1993

[54] TWO-COMPONENT AQUEOUS POLYURETHANE DISPERSIONS WITH REDUCED SOLVENT CONTENT AND COATINGS PREPARED THEREFROM WITH IMPROVED GLOSS

[75] Inventor: Patricia B. Jacobs, Pittsburgh, Pa.

[73] Assignee: Miles Inc., Pittsburgh, Pa.

[21] Appl. No.: 930,099

[22] Filed: Aug. 14, 1992

Related U.S. Application Data

[63] Continuation-in-part of Ser. No. 643,615, Jan. 22, 1991, abandoned.

[51] Int. Cl.$^5$ .................. C08L 75/12; C08G 18/64
[52] U.S. Cl. .................. 524/591; 524/839; 524/840; 524/875; 525/457; 528/60; 528/65; 528/85
[58] Field of Search .............. 524/591, 839, 840, 875; 525/457; 528/60, 65, 85

[56] References Cited

U.S. PATENT DOCUMENTS

| | | | |
|---|---|---|---|
| 3,730,927 | 5/1973 | Schloss | 524/591 |
| 4,251,427 | 2/1981 | Recker et al. | 524/875 |
| 4,501,852 | 2/1985 | Markusch et al. | 524/840 |
| 4,608,413 | 8/1986 | Nachtkamp et al. | 524/591 |
| 4,925,885 | 5/1990 | Rosthauser et al. | 524/591 |

FOREIGN PATENT DOCUMENTS

| | | |
|---|---|---|
| 0324370 | 7/1989 | European Pat. Off. |
| 57-143366 | 9/1982 | Japan |
| 1048955 | 11/1966 | United Kingdom |

*Primary Examiner*—John Kight, III
*Assistant Examiner*—Rabon Sergent
*Attorney, Agent, or Firm*—Joseph C. Gil; Thomas W. Roy

[57] ABSTRACT

The present invention relates to a two-component, aqueous polyurethane coating composition which may be cured at ambient temperature and which contains
I) an isocyanate-reactive component containing
  A) aqueously dispersed polyurethane wherein the polyurethane has
    a) an average hydroxy functionality of at least 1.8,
    b) a total content of urethane and urea groups, calculated as —NH—CO—, of 9 to 20% by weight, based on the weight of the polyurethane,
    c) sufficient chemically incorporated anionic groups and
    d) ethylene oxide units incorporated within terminal and/or lateral polyether chains
  to maintain the polyurethane stably dispersed in water, and
  B) 5 to 20%, based on the weight of components I and II, of a polyol which has a molecular weight of 62 to 1000 and may contain ether groups and
II) a water dispersible polyisocyanate having
  a) an isocyanate content of 2 to 30% by weight, based on the weight of the polyisocyanate,
  b) an average functionality of at least 1.8,
  c) sufficient chemically incorporated anionic groups and
  d) ethylene oxide units incorporated within terminal and/or lateral polyether chains,
  to maintain the polyisocyanate stably dispersed in water, and components I and II are present in an amount sufficient to provide an equivalent ratio of isocyanate groups to hydroxyl groups of 0.8:1 to 4:1.

The present invention is also directed to the coatings prepared from these coating compositions.

20 Claims, No Drawings

TWO-COMPONENT AQUEOUS POLYURETHANE DISPERSIONS WITH REDUCED SOLVENT CONTENT AND COATINGS PREPARED THEREFROM WITH IMPROVED GLOSS

This application is a continuation-in-part of U.S. application Ser. No. 07/643,615, now abandoned filed on Jan. 22, 1991.

BACKGROUND OF THE INVENTION

1. Field of the Invention

The present invention relates to two-component aqueous polyurethane dispersions which have a reduced solvent content and may be cured at ambient temperatures, and to the coatings prepared therefrom which in addition to excellent hardness, flexibility and solvent resistance have improved gloss.

2. Description of the Prior Art

Aqueous polyurethane dispersions and their use for the production of coatings is known. The dispersions may be cured at ambient temperature by evaporation of water and coalescence of the individual particles. These aqueous-based products have been developed in an effort to reduce the amount of organic solvents which are present in corresponding solvent-based coating compositions. Even though the prior art dispersions possess many valuable properties, it has not been possible to obtain coatings which possess all of the properties of coatings obtained from solvent-based coating compositions, especially hardness and solvent resistance, until these objects were achieved in copending application, U.S. Ser. No. 07/559,805, now abandoned.

The copending application relates to two-component coating compositions based on a water dispersible, hydroxy functional polyurethane and a water dispersible polyisocyanate which cure to form coatings with excellent hardness and solvent resistance. One of the disadvantages of these coating compositions is that it is not possible to obtain coatings which have a high gloss unless large amounts of organic cosolvents are added to the dispersions. Since one of the primary reasons for developing aqueous-based coating compositions was to reduce or eliminate the use of organic solvents, the need to add these solvents to obtain coatings which have a high gloss is counter-productive.

Accordingly, it is an object of the subject application to provide coating compositions which do not require large amounts of organic solvents in order to produce high gloss coatings. It is an additional object of the present invention to provide coating compositions which possess all of the advantages of those disclosed in the previously discussed copending application.

These objects may be achieved in accordance with the present invention using low molecular weight polyols as additives for the two-component aqueous coating compositions as described hereinafter.

SUMMARY OF THE INVENTION

The present invention relates to a two-component, aqueous polyurethane coating composition which may be cured at ambient temperature and which contains I) an isocyanate-reactive component containing
  A) an aqueously dispersed polyurethane wherein the polyurethane has
    a) an average hydroxy functionality of at least 1.8,
    b) a total content of urethane and urea groups, calculated as —NH—CO—, of 9 to 20% by weight, based on the weight of the polyurethane,
    c) 0 to 200 milliequivalents of chemically incorporated anionic groups per 100 g of polyurethane and
    d) 0 to 25% by weight, based on the weight of the polyurethane, of ethylene oxide units incorporated within terminal and/or lateral polyether chains,
    wherein c) and d) are present in an amount which is sufficient to maintain the polyurethane stably dispersed in water, and
  B) 2 to 20%, based on the weight of components I and II, of a polyol which has a molecular weight of 62 to 1000 and may contain ether groups and
II) a water dispersible polyisocyanate wherein the polyisocyanate has
  a) an isocyanate content of 2 to 30% by weight, based on the weight of the polyisocyanate,
  b) an average functionality of at least 1.8,
  c) 0 to 200 milliequivalents of chemically incorporated anionic groups per 100 g of polyisocyanate and
  d) 0 to 25% by weight, based on the weight of the polyurethane, of ethylene oxide units incorporated within terminal and/or lateral polyether chains,
  wherein c) and d) are present in an amount which is sufficient to maintain the polyisocyanate stably dispersed in water, and
components I and II are present in an amount sufficient to provide an equivalent ratio of isocyanate groups to hydroxyl groups of 0.8:1 to 4:1.

The present invention is also directed to the coatings prepared from these coating compositions.

DETAILED DESCRIPTION OF THE INVENTION

Suitable polyols which may be used as additives in accordance with the present invention to improve the gloss of coatings prepared from the two component coating compositions are polyols which may contain ether groups. The polyols have a molecular weight of 62 to 1000, preferably 120 to 250. Examples of these polyols include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl-1,3-pentanediol, glycerine, trimethylol propane, diethylene glycol, triethylene glycol, tetraethylene glycol, dipropylene glycol, tripropylene glycol, tetrapropylene glycol, dibutylene glycol, tributylene glycol and tetrabutylene glycol. Also, suitable are the ethoxylation and/or propoxylation products of the preceding polyols, preferably the monomeric polyols. The polyols are used in an amount of 2 to 20% by weight, preferably 5 to 15% by weight, based on the weight of components I and II.

The higher molecular weight ether group-containing polyols are less preferred as additives for the coating compositions of the present invention because even though they improve the gloss of the resulting coatings, either the storage stability of the coating compositions or some of the other properties of the resulting coatings are not as good as those obtained from the preferred low molecular weight polyols.

The hydroxy functional polyurethanes used in conjunction with the water dispersible polyisocyanates and polyol additives in accordance with the present invention have an average hydroxy functionality of at least 1.8, preferably 1.8 to 8, more preferably 2 to 6 and most preferably 2.5 to 6; a total content of urethane and urea groups of 9 to 20% by weight, preferably about 10 to 17% by weight; and an average hydroxy equivalent weight (which may be calculated by an end group analysis) of about 100 to 5000, preferably 500 to 4000 and more preferably 1000 to 3000.

The hydroxy functional polyurethanes are based on the reaction product of organic polyisocyanates with high molecular weight polyols, optionally low molecular weight, isocyanate-reactive compounds, and at least one of isocyanate-reactive compounds containing anionic or potential anionic groups and isocyanate-reactive compounds containing nonionic hydrophilic groups. The reactants and their amounts are selected to ensure that the resulting polyurethane is hydroxy functional.

Suitable polyisocyanates for preparing the hydroxy functional polyurethane include any organic polyisocyanate, preferably monomeric diisocyanates. Especially preferred are polyisocyanates, especially diisocyanates, having aliphatically- and/or cycloaliphatically-bound isocyanate groups, although polyisocyanates having aromatically-bound isocyanate groups are not excluded and may be used.

Examples of suitable polyisocyanates which may be used include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and/or -1,4-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4- and/or 2,6-hexahydrotoluylene diisocyanate, 2,4'- and/or 4,4'-dicyclohexylmethane diisocyanate, $\alpha,\alpha,\alpha',\alpha'$-tetramethyl-1,3- and/or -1,4-xylylene diisocyanate, 1,3- and 1,4-xylylene diisocyanate, 1-isocyanato-1-methyl-4(3)-isocyanatomethylcyclohexane, 1,3- and 1,4-phenylene diisocyanate, 2,4- and/or 2,6-toluylene diisocyanate, diphenyl methane-2,4'- and/or -4,4'-diisocyanate, naphthalene-1,5-diisocyanate, triphenyl methane-4,4',4''-triisocyanate, polyphenyl polymethylene polyisocyanates of the type obtained by condensing aniline with formaldehyde followed by phosgenation, and mixtures of the above-mentioned polyisocyanates.

Suitable high molecular weight polyols for preparing the hydroxy functional polyurethane include those which are known from polyurethane chemistry and have molecular weights ($M_n$) of 400 to 6,000, preferably 400 to 3,000. Examples of the high molecular weight compounds include:

1) polyhydroxy polyesters which are obtained from polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cyclocycloaliphatic, aromatic and/or heterocyclic and they may be unsaturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydropthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl-1,3-pentanediol, glycerine and trimethylol propane.

2) Polylactones generally known from polyurethane chemistry, e.g., polymers of $\epsilon$-caprolactone initiated with the above-mentioned polyhydric alcohols.

3) Polycarbonates containing hydroxyl groups such as the products obtained from reaction of the polyhydric alcohols previously set forth for preparing the polyhydroxy polyesters (preferably dihydric alcohols such as 1,3-propanediol, 1,4-butanediol, 1,4-dimethylol cyclohexane, 1,6-hexanediol, diethylene glycol, triethylene glycol or tetraethylene glycol) with phosgene, diaryl carbonates such as diphenyl carbonate or cyclic carbonates such as ethylene or propylene carbonate. Also suitable are polyester carbonates obtained by the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Certain proportions of ethylene oxide may also be included, provided the polyether does not contain more than 10% by weight of ethylene oxide; however, polyethers which do not contain ethylene oxide are preferably used. Suitable starting compounds containing at least one reactive hydrogen atom include the polyols set forth as suitable for preparing the polyhydroxy polyesters and, in addition, water, methanol, ethanol, 1,2,6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include ethylene diamine, diethylene triamine, triethylene tetraamine, 1,6-hexanediamine, piperazine, 2,5-dimethyl piperazine, 1-amino-3-aminomethyl-3,5,5-trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides and bis-semicarbazides, ammonia, methylamine, tetramethylenediamine, ethanolamine, diethanolamine, triethanolamine, aniline, phenylenediamine, 2,4- and 2,6-toluylenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive-NH groups are much less preferred.

Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; and 3,110,695; and German Patent No. 1,152,536). Also suitable as polyethers are amino polyethers wherein at least a portion of the hydroxyl groups of the previously described polyethers are converted to amino groups.

5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

6) Polyacetals including those obtained from the above-mentioned polyhydric alcohols, especially diethylene glycol, triethylene glycol, 4,4'-dioxyethoxy-diphenyldimethylene, 1,6-hexanediol and formaldehyde. Polyacetals suitable for use in the invention may also be prepared by the polymerization of cyclic acetals.

7) Polyether esters containing isocyanate-reactive groups and known in the art.

8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

The preferred high molecular weight isocyanate-reactive compounds for use in the process according to the invention are the dihydroxy polyesters, dihydroxy polylactones, dihydroxy polycarbonates and dihydroxy polyester carbonates.

Suitable low molecular weight isocyanate-reactive compounds which may optionally be used in accordance with the present invention to prepare the hydroxy functional polyurethanes have molecular weights of up to about 400 and functionalities which correspond to those of the hydroxy functional polyurethanes. Examples include the polyols and diamines previously set forth for use in the preparation of the polyhydroxy polyesters and the polyethers and the aminoalcohols set forth hereinafter.

In order to make the hydroxy functional polyurethanes water dispersible, it is necessary to chemically incorporate hydrophilic groups, i.e., anionic groups, potential anionic groups or nonionic hydrophilic groups, into the polyisocyanate component. Suitable hydrophilic components contain at least one isocyanate-reactive group and at least one hydrophilic group or potential hydrophilic group. Examples of compounds which may be used to incorporate potential ionic groups include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below 400. It should be emphasized that the carboxylic acid groups are not considered to be isocyanate-reactive groups due to their sluggish reactivity with isocyanates.

The preferred anionic groups for incorporation into the hydroxy functional polyurethanes in the present invention are carboxylate groups and these groups may be introduced by using hydroxy-carboxylic acids of the general formula:

$$(HO)_xQ(COOH)_y$$

wherein
Q represents a straight or branched, hydrocarbon radical containing 1 to 12 carbon atoms, and
x and y represent values from 1 to 3.

Examples of these hydroxy-carboxylic acids include citric acid and tartaric acid.

The preferred acids are those of the above-mentioned formula wherein $x=2$ and $y=1$. These dihydroxy alkanoic acids are described in U.S. Pat. No. 3,412,054, herein incorporated by reference. The preferred group of dihydroxy alkanoic acids are the $\alpha,\alpha$-dimethylol alkanoic acids represented by the structural formula:

$$\begin{array}{c} CH_2OH \\ | \\ Q'-C-COOH \\ | \\ CH_2OH \end{array}$$

wherein Q' is hydrogen or an alkyl group containing 1 to 8 carbon atoms. The most preferred compound is $\alpha,\alpha$-dimethylol propionic acid, i.e, wherein Q' is methyl in the above formula.

The acid groups may be converted into hydrophilic anionic groups by treatment with a neutralizing agent such as an alkali metal salt, ammonia or a primary, secondary or preferably tertiary amine in an amount sufficient to render the hydroxy functional polyurethanes water dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile organic compounds such as volatile amines since they lead to reduced resistance to water swell in the coatings produced from the water dispersible compositions of the present invention. Therefore, less than 50%, preferably less than 20% and most preferably none of the acid groups should be neutralized with alkali metals.

The preferred volatile amines for neutralizing the acid groups are the tertiary amines, while ammonia and the primary and secondary amines are less preferred. Examples of suitable amines include trimethylamine, triethylamine, triisopropylamine, tributylamine, N,N-dimethyl-cyclohexylamine, N,N-dimethylstearylamine, N,N-dimethylaniline, N-methylmorpholine, N-ethylmorpholine, N-methylpiperazine, N-methylpyrrolidine, N-methylpiperidine, N,N-dimethylethanolamine, N,N-diethylethanolamine, triethanolamine, N-methyldiethanolamine, dimethylaminopropanol, 2-methoxyethyl-dimethylamine, N-hydroxyethylpiperazine, 2-(2-dimethylaminoethoxy)ethanol and 5-diethylamino-2-pentanone. The most preferred tertiary amines are those which do not contain isocyanate-reactive groups as determined by the Zerewitinoff test since they are capable of reacting with isocyanate groups during the curing of the compositions of the present invention.

In a preferred embodiment of the present invention volatile tertiary amines are used so that when the water dispersible coating composition of the subject application are cured, the tertiary amine is removed from the coated substrate.

The acid groups may be converted into hydrophilic anionic groups by treatment with the alkali metal or preferably the volatile amine either before, during or after their incorporation into the hydroxy functional polyurethane. However, it is preferred to neutralize the acid groups after their incorporation.

The compounds containing lateral or terminal, hydrophilic ethylene oxide units have at least one, preferably one, isocyanate-reactive group and are an optional component, which may be present in an amount sufficient to provide a content of hydrophilic ethylene oxide units (calculated as —$CH_2$—$CH_2$—O—) present in lateral or terminal chains of up to 25% by weight. When compounds containing hydrophilic ethylene oxide units are used, they are preferably incorporated into the hydroxy functional polyurethanes in an amount sufficient to provide a content of hydrophilic ethylene oxide units of greater than 1% by weight, more preferably greater than 3% by weight, based on the weight of the hydroxy functional polyurethane. The preferred upper limit for the hydrophilic ethylene oxide units is 10% by weight, more preferably 7% by weight, based on the weight of the hydroxy functional polyurethane.

Hydrophilic components having terminal or lateral hydrophilic chains containing ethylene oxide units include compounds corresponding to the formulas

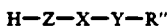

or

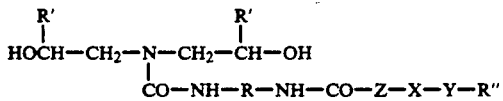

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R" represents a monovalent hydrocarbon radical having from 1 to 12 carbon atoms, preferably an unsubstituted alkyl radical having from 1 to 4 carbon atoms,
X represents the radical obtained by removing the terminal oxygen atom from a polyalkylene oxide chain having from 5 to 90 chain members, preferably 20 to 70 chain members, wherein at least 40%, preferably at least 65%, of the chain members comprise ethylene oxide units and the remainder comprises other alkylene oxide units such as propylene oxide, butylene oxide or styrene oxide units, preferably propylene oxide units,
Y represents oxygen or —NR'''— wherein R''' has the same definition as R" and
Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The hydroxy functional polyurethanes have a content of chemically incorporated anionic groups of 0 to 200, preferably 10 to 200, more preferably 10 to 180 and most preferably 20 to 100 milliequivalents per 100 g of solids, and a content of chemically incorporated nonionic groups of 0 to 25% by weight. When compounds containing hydrophilic ethylene oxide units are used, they are preferably incorporated into the hydroxy functional polyurethanes in an amount sufficient to provide a content of hydrophilic ethylene oxide units of greater than 1% by weight, more preferably greater than 3% by weight, based on the weight of the hydroxy functional polyurethane. The upper limit for the content of the hydrophilic ethylene oxide units is preferably 10% by weight, more preferably 7% by weight, based on the weight of the hydroxy functional polyurethane. The amounts of the anionic groups and hydrophilic ethylene oxide units must be sufficient for the hydroxy functional polyurethane to remain stably dispersed in water.

The hydroxy functional polyurethanes may be produced according to methods known in the art. For example, the above-mentioned reaction components may be added in any sequence. One preferred method comprises mixing all of the isocyanate-reactive components and subsequently reacting the mixture with the polyisocyanate. The number of isocyanate-reactive groups per isocyanate group is maintained at 1.1:1 to 4:1, preferably 1.2:1 to 1.8:1. The mixture is then reacted until no further NCO groups can be detected. The reaction may take place in the melt or in the presence of organic solvents. Suitable solvents include the water-miscible solvents normally used in polyurethane chemistry such as esters, ketones, halogenated hydrocarbons, alkanes and arenes. Low boiling solvents include those boiling at temperatures in the range of 40° to 90° C. such as acetone and methyl ethyl ketone. In addition, higher boiling solvents such as N-methyl pyrrolidone, dimethyl formamide, dimethyl sulfoxide, propylene glycol monomethyl ether acetate and ethylene glycol mono(-methyl, -ethyl or -butyl) ether acetate may be utilized.

In another preferred method an NCO terminated prepolymer is prepared by reacting the polyisocyanate with the high molecular weight polyol, the isocyanate-reactive compound containing the hydrophilic or potential hydrophilic group and optionally a low molecular weight compound containing at least two isocyanate reactive groups. The NCO prepolymer is then converted to a hydroxy functional polyurethane by a further reaction with a primary or secondary monoamine containing at least one hydroxy group. Suitable examples of these monoamines include ethanolamine, N-methylethanolamine, diethanolamine, 3-amino-1-propanol and 2-amino-2-hydroxymethylpropane-1,3-diol.

In a further preferred method an NCO terminated prepolymer is prepared as described above. However, instead of capping the isocyanate groups with a monoamine, the NCO terminated prepolymer is chain extended with a hydroxy group-containing polyamine, e.g, N-hydroxyethyl-ethylene diamine. When this chain extender is used in an amount which is sufficient to provide an NCO:NH ratio of approximately 1, a chain extended, hydroxy functional polyurethane is obtained which contains lateral hydroxy groups.

The water dispersible polyisocyanates to be used according to the invention have an (average) NCO functionality of at least 1.8, preferably 2 to 8 and more preferably 2.5 to 6, and an NCO content of 2 to 30%, preferably 10 to 25%. Their dispersibility in water is ensured by a sufficient content of suitable emulsifiers.

Suitable polyisocyanates for preparing the water dispersible polyisocyanates include any of the monomeric diisocyanates or polyisocyanates which have previously been described as suitable for the preparation of the hydroxy functional polyurethanes, preferably the monomeric aliphatic and/or cycloaliphatic diisocyanates. However, it is preferred to prepare the water dispersible polyisocyanates from polyisocyanate adducts containing carbodiimide, uretdione, biuret, allophanate, urethane or isocyanurate groups, or from NCO prepolymers which have been prepared from the previously described aliphatic and/or cycloaliphatic diisocyanates.

Suitable polyisocyanate adducts include:

1) Isocyanurate group-containing polyisocyanates prepared from the previously described aliphatic and/or cycloaliphatic diisocyanates. Particularly preferred are isocyanato-isocyanurates based on 1,6-diisocyanatohexane and/or 1-isocyanato-3,3,5-trimethyl-5-isocyanatomethylcyclohexane (isophorone diisocyanate or IPDI). The production of these isocyanurate group-containing polyisocyanates is described, for example, in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates prepared from the previously described aliphatic and/or cycloaliphatic diisocyanates. The uretdione diisocyanates are preferably prepared from hexamethylene diisocyanate and/or of IPDI. The uretdione diisocyanates can be used as the sole component for preparing the water dispersible polyisocyanates or in admixture with other aliphatic and/or cycloaliphatic polyisocyanates, particularly the isocyanurate group-containing polyisocyanates set forth under (1) above.

3) Biuret group-containing polyisocyanates prepared from the previously described aliphatic and/or cycloaliphatic diisocyanates, particularly tris-(6-isocyanatohexyl)-biuret or mixtures thereof with its higher homologues. The biuret group-containing polyisocyanates generally have a most preferred NCO content of 18 to 22% by weight and an average NCO functionality of 3 to 3.5.

4) Urethane and/or allophanate group-containing polyisocyanates prepared from the previously described aliphatic and/or cycloaliphatic diisocyanates, preferably hexamethylene diisocyanate or IPDI, by reacting excess quantities of the diisocyanates with the previously described low molecular weight polyols, preferably trimethylol propane, glycerine, 1,2-dihydroxy propane or mixtures thereof. The urethane and/or allophanate group-containing polyisocyanates have a most preferred NCO content of 12 to 20% by weight and an (average) NCO functionality of 2.5 to 3.

5) Oxadiazinetrione group-containing polyisocyanates prepared from the previously described aliphatic and/or cycloaliphatic diisocyanates, preferably hexamethylene diisocyanate.

The materials to be used for the preparation of the water dispersible NCO prepolymer are the same as those used for the preparation of the hydroxy functional polyurethane. In contrast to the hydroxy functional polyurethanes the NCO prepolymers have terminal isocyanate groups. The type and proportions of the above-mentioned starting materials are therefore selected such that the resulting prepolymers have terminal isocyanate groups.

The NCO prepolymers are less preferred than the polyisocyanate adducts for use in the preparation of the water dispersible polyisocyanates because due to their higher molecular weight they also have a higher viscosity. The higher viscosity may necessitate the additional use of a solvent in order to maintain the polyisocyanate stably dispersed in water after it is blended with the aqueous dispersion of the hydroxy functional polyurethane.

Mixtures of the monomeric polyisocyanates, the polyisocyanate adducts and/or the NCO prepolymers may also be used for preparing the water dispersible polyisocyanates.

The compounds for providing hydrophilicity to the water dispersible polyisocyanates are also the same as those previously described for providing hydrophilicity to the hydroxy functional polyurethanes. The water dispersible polyisocyanates are prepared by reacting the polyisocyanates with the hydrophilic compounds containing isocyanate-reactive groups, preferably with the monofunctional, nonionic hydrophilic polyether alcohols, in an amount sufficient to provide the desired amount of hydrophilic groups at a temperature of 50° to 130° C.

The water dispersible polyisocyanates have a content of chemically incorporated nonionic groups of 0 to 25% by weight, preferably 2 to 25% by weight, more preferably 5 to 20% by weight and most preferably 7 to 15% by weight of hydrophilic ethylene oxide units (calculated as $-CH_2-CH_2-O-$) incorporated in lateral or terminal polyether chains, and a content of chemically incorporated anionic groups of 0 to 200 milliequivalents per 100 g of solids, based on the weight of the water dispersible polyisocyanate. When anionic groups are used, they are preferably incorporated into the water dispersible polyisocyanate in an amount sufficient to provide an anionic group content of least 10, more preferably at least 20 milliequivalents per 100 g of solids, based on the weight of the water dispersible polyisocyanate. The upper limit for the content of the anionic groups is preferably 180, more preferably 100 milliequivalents per 100 g of solids, based on the weight of the water dispersible polyisocyanate.

In order to reduce the viscosity of the water dispersible polyisocyanates an organic solvent such as those previously described for use with the hydroxy functional polyurethanes may be added to the water dispersible polyisocyanate before they are blended with the hydroxy functional polyurethane. It is also possible to convert the water dispersible polyisocyanates into aqueous dispersions with a solids content of 10 to 90% by weight. The production of these dispersions should take place shortly before the dispersed polyisocyanates are blended with the hydroxy functional polyurethanes.

The water dispersible polyisocyanate should not be blended with the hydroxy functional polyurethane or the polyol additive until it is time to apply the coating composition to a suitable substrate. As with two component, solvent based coating compositions, the mixture of the coreactants has a limited useful potlife, which is dependent upon the reactivity of the coreactants, ratios of coreactants and catalysts present in the system. When it is desired to blend the components, the components may be blended in any order. Methods for blending the components are known in the art.

In a preferred embodiment the polyol additive is blended with the hydroxy functional polyurethane, the mixture is dispersed in water and then the water dispersible polyisocyanate is added to this dispersed mixture with mild stirring. In another preferred embodiment the hydroxy functional urethane is prepared by dispersing an NCO prepolymer in water and then chain extending it with an amino alcohol. In accordance with this embodiment the polyol additive may be added to the NCO prepolymer before it is dispersed in water or it may be added to the water in admixture with the chain extender. When the polyol additive is blended with either the hydroxy functional polyurethane or the NCO prepolymer before dispersion in water, it reduces the viscosity of this component and makes it easier to disperse.

The hydroxy functional polyurethane and the water dispersible polyisocyanate should be blended in amounts sufficient to provide a ratio of isocyanate groups from the water dispersible polyisocyanate to hydroxy groups of component I (i.e., both the hydroxy functional polyurethane and the polyol additive) of 0.8:1 to 6:1, preferably about 1.2:1 to 4:1. After the two components have been blended the coating composition should have a solids content of about 2 to 60%, preferably about 10 to 50% by weight.

The aqueous coating compositions according to the present invention may be applied to substrates using any of the various techniques known in the art. In addition, the aqueous compositions may be blended with other types of resins optionally containing isocyanate-reactive groups or with amine- or phenol-formaldehyde condensates known in the art. They can also contain pigments, levelling agents, catalysts, and other auxiliaries known in the art. Examples of the application techniques, resins and auxiliaries are set forth in U.S. Pat. No. 4,408,008, which is herein incorporated by reference.

The invention is further illustrated but is not intended to be limited by the following examples in which all parts and percentages are by weight unless otherwise specified.

EXAMPLES

Isocyanate Crosslinker

To 900 parts of a polyisocyanate containing isocyanurate groups and prepared from hexamethylene diisocyanate (Desmodur N-3300, available from Mobay Corp.) were added 100.0 parts of a polyether monohydric alcohol having an OH number of 26.2 and prepared from n-butanol, ethylene oxide, and propylene oxide (molar ratio of ethylene oxide to propylene oxide—83:17). The reaction mixture was stirred and heated at 110° C. for 1.5 hours.

Solids content—100%.
Viscosity—3900 mPa.s (25° C., #4 spindle, 60 rpm).
Isocyanate content—18.8%.

EXAMPLE 1

Preparation of Dispersion A

A mixture of 125.1 parts of a polyester of phthalic anhydride and hexanediol (OH number 56), 6.2 parts of neopentylglycol, 8.3 parts of α,α dimethylolpropionic acid, and 30 parts of N-methylpyrrolidone was heated to 70° C. with stirring. To this mixture 60.6 parts of 4,4'-dicyclohexylmethane diisocyanate was added, and the resulting mixture was stirred and heated to 105° C. for two hours until the theoretical isocyanate content of 1.7% was reached. The mixture was cooled to 80° C., and 6.0 parts of triethylamine was added. After stirring for 15 minutes at 70° C., 9.8 parts of diethanolamine was added. The reaction exothermed to 86° C. and the mixture was cooled to 75° C. and stirred until no isocyanate groups were detected by IR. Immediately before dispersing in water, 60 parts of tripropylene glycol was added to the reaction mixture, which was then dispersed in 294.0 parts of distilled water at 50° C. and stirred for one hour.

pH—7.8.
Viscosity—325 mPa.s (25° C., Brookfield #2 spindle, 60 rpm).
Solids content—45%.
functionality—4.
Urethane/urea content—13.0%.

Two Component Formulation

To 50.0 parts of Dispersion A were added 44.9 parts of the Isocyanate Crosslinker (NCO:OH equivalent ratio—3:1) and 5 drops of a 10% aqueous solution of surfactant (Stilwet L-77, available from Union Carbide); the mixture was stirred vigorously. 19.0 parts of distilled water was then stirred into the emulsion. A drawdown bar was used to make 5 mil (wet film thickness) films on glass plates and steel panels. The film properties are reported in the table following Example 2.

EXAMPLE 2 (Comparison)

Preparation of Dispersion B

A dispersion was prepared as in Example 1 except that the tripropylene glycol was omitted from the formulation, and the reaction mixture was dispersed in 354 parts of distilled water.

pH—9.1.
Viscosity—940 mPa.s (25° C., Brookfield #2 spindle, 30 rpm).
Solids content—35%.
functionality—4.
Urethane/urea content—13.0%.

Two Component Formulation

To 75.0 parts of Dispersion B were added 15.5 parts of the Isocyanate Crosslinker (NCO:OH equivalent ratio—3:1) and 5 drops of the surfactant from Example 1 a 10% aqueous solution of Stilwet L-77 (Union Carbide); the mixture was stirred vigorously. A drawdown bar was used to make 5 mil (wet film thickness) films on glass plates and steel panels. The films from Examples 1 and 2 were cured at 75° C. and 55% relative humidity for 2 weeks. The film properties are set forth in the following table.

| Example | MEK 2X Rubs | Tensile (psi) | Impact Dir/Ind | Pendulum Hardness | 60° C. Gloss |
|---|---|---|---|---|---|
| 1 | 200+ | 5534 | 160/160 | 141 sec | 97 |
| 2 (Comp) | 200+ | 3686 | 160/160 | 88 sec | 30 |

EXAMPLES 3-8

Dispersions were prepared as in Example 1 except the alternate materials and/or quantities set forth in the following table were substituted for the 60 parts of tripropylene glycol used in Example 1. Because the number of hydroxyl equivalents varied among the different additives, minor adjustments were made to the amount of Isocyanate Crosslinker used to prepare the dispersions in order to maintain an NCO:OH equivalent ratio of 3:1.

| Example # | Additive | Amount of Additive (Parts) | 60° Gloss of Two Component Film |
|---|---|---|---|
| 3 | Tripropylene glycol | 30 | 86 |
| 4 | Trimethylolpropane | 30 | 85 |
| 5 | Diethylene glycol | 30 | 89 |
| 6 | 2-ethyl-1,3-hexane diol | 30 | 94 |
| 7 | Polyether 1* | 60 | 91 |
| 8 | Polyether 2** | 30 | 90 |

*Polyether having an OH number of 561 and prepared by the ethoxylation of diethylene glycol.
**Polyether having an OH number of 250 and prepared by the propoxylation of glycerol.

Although the invention has been describe din detail in the foregoing for the purpose of illustration, it is to be understood that such detail is solely for that purpose and that variations can be made therein by those skilled in the art without departing from the spirit and scope of the invention except a it may be limited by the claims.

What is claimed is:

1. A two-component, aqueous polyurethane coating composition which may be cured at ambient temperature and which contains
   I) an isocyanate-reactive component comprising
      A) an aqueously dispersed polyurethane wherein said polyurethane has
         a) an average hydroxy functionality of at least 1.8,
         b) a total content of urethane and urea groups, calculated as —NH—CO—, of 9 to 20% by weight, based on the weight of said polyurethane,
         c) 0 to 200 milliequivalents of chemically incorporated anionic groups per 100 g of polyurethane and
         d) 0 to 25% by weight, based on the weight of said polyurethane, of ethylene oxide units incorporated within terminal and/or lateral polyether chains,
         wherein c) and d) are present in an amount which is sufficient to maintain the polyurethane stably dispersed in water, and
      B) 2 to 20%, based on the weight of components I and II, of a polyol which has a molecular weight of 62 to 1000 and may contain ether groups and
   II) a water dispersible polyisocyanate wherein said polyisocyanate has
      a) an isocyanate content of 2 to 30% by weight, based on the weight of the polyisocyanate,
      b) an average functionality of at least 1.8,
      c) 0 to 200 milliequivalents of chemically incorporated anionic groups per 100 g of polyisocyanate and
      d) 0 to 25% by weight, based on the weight of said polyisocyanate, of ethylene oxide units incorporated within terminal and/or lateral polyether chains,
      wherein c) and d) are present in an amount which is sufficient to maintain said polyisocyanate stably dispersed in water, and
   components I and II are present in an amount sufficient to provide an equivalent ratio of isocyanate groups to hydroxyl groups of 0.8:1 to 6:1.

2. The coating composition of claim 1 wherein said aqueously dispersed polyurethane has a hydroxy equivalent weight of 100 to 5000.

3. The coating composition of claim 1 wherein said aqueously dispersed polyurethane has a hydroxy equivalent weight of 1000 to 3000, an average functionality of 2 to 6 and 10 to 180 milliequivalents of chemically incorporated anionic groups per 100 g of polyurethane.

4. The coating composition of claim 1 wherein said polyol has a molecular weight of 62 to 250 and may contain ether groups.

5. The coating composition of claim 1 wherein said aqueously dispersed polyisocyanate is based on the reaction product of a polyisocyanate adduct, and has an NCO functionality of 2.5 to 6, an NCO content of 10 to 25% by weight, based on the weight of said polyisocyanate and contains 2 to 15% by weight, based on the weight of said polyisocyanate, of ethylene oxide units incorporated within terminal and/or lateral polyether chains.

6. The coating composition of claim 5 wherein said polyisocyanate adduct has aliphatically and/or cycloaliphatically bound isocyanate groups.

7. The coating composition of claim 5 wherein said polyisocyanate contains isocyanurate groups and is prepared from 1,6-hexamethylene diisocyanate.

8. A two-component, aqueous polyurethane coating composition which may be cured at ambient temperature and which contains
   I) an isocyanate-reactive component comprising
      A) an aqueously dispersed polyurethane wherein said polyurethane has
         a) an average hydroxy functionality of at least 2 to 8,
         b) a total content of urethane and urea groups, calculated as —NH—CO—, of 9 to 20% by weight, based on the weight of said polyurethane,
         c) 10 to 180 milliequivalents of chemically incorporated anionic groups per 100 g of polyurethane,
         d) 0 to 25% by weight, based on the weight of said polyurethane, of ethylene oxide units incorporated within terminal and/or lateral polyether chains and
         e) a hydroxy equivalent weight of 500 to 4000,
         wherein c) and d) are present in an amount which is sufficient to maintain the polyurethane stably dispersed in water, and
      B) 2 to 20%, based on the weight of components I and II, of a polyol which has a molecular weight of 62 to 250 and may contain ether groups and
   II) a water dispersible polyisocyanate wherein said polyisocyanate is based on the reaction product of a polyisocyanate adduct and has
      a) an isocyanate content of 10 to 25% by weight, based on the weight of the polyisocyanate,
      b) an average functionality of at least 2.5 to 6, c) 0 to 200 milliequivalents of chemically incorporated anionic groups per 100 g of polyisocyanate and d) 2 to 15% by weight, based on the weight of said polyisocyanate, of ethylene oxide units incorporated within terminal and/or lateral polyether chains, wherein c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

9. The coating composition of claim 8 wherein said polyisocyanate adduct has aliphatically and/or cycloaliphatically bound isocyanate groups.

10. The coating composition of claim 8 wherein said polyisocyanate contains isocyanurate groups and is prepared from 1,6-hexamethylene diisocyanate.

11. A coating which is prepared from a two-component, aqueous polyurethane coating composition which may be cured at ambient temperature and which contains I) an isocyanate-reactive component comprising
   A) an aqueously dispersed polyurethane wherein said polyurethane has
      a) an average hydroxy functionality of at least
      b) a total content of urethane and urea groups, calculated as —NH—CO—, of 9 to 20% by weight, based on the weight of said polyurethane,
      c) 0 to 200 milliequivalents of chemically incorporated anionic groups per 100 g of polyurethane and
      d) 0 to 25% by weight, based on the weight of said polyurethane, of ethylene oxide units incorporated within terminal and/or lateral polyether chains,
      wherein c) and d) are present in an amount which is sufficient to maintain the polyurethane stably dispersed in water, and
   B) 2 to 20%, based on the weight of components I and II, of a polyol which has a molecular weight of 62 to 1000 and may contain ether groups and
II) a water dispersible polyisocyanate wherein said polyisocyanate has
   a) an isocyanate content of 2 to 30% by weight, based on the weight of the polyisocyanate,
   b) an average functionality of at least 1.8,
   c) 0 to 200 milliequivalents of chemically incorporated anionic groups per 100 g of polyisocyanate and
   d) 0 to 25% by weight, based on the weight of said polyisocyanate, of ethylene oxide units incorporated within terminal and/or lateral polyether chains,
   wherein c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

12. The coating of claim 11 wherein said aqueously dispersed polyurethane has a hydroxy equivalent weight of 100 to 5000.

13. The coating of claim 11 wherein said aqueously dispersed polyurethane has a hydroxy equivalent weight of 1000 to 3000, an average functionality of 2 to 6, and 10 to 180 milliequivalents of chemically incorporated anionic groups per 100 g of polyurethane.

14. The coating of claim 11 wherein said polyol has a molecular weight of 62 to 250 and may contain ether groups.

15. The coating of claim 11 wherein said aqueously dispersed polyisocyanate is based on the reaction product of a polyisocyanate adduct, and has an NCO functionality of 2.5 to 6, an NCO content of 10 to 25% by weight, based on the weight of said polyisocyanate and contains 2 to 15% by weight, based on the weight of said polyisocyanate, of ethylene oxide units incorporated within terminal and/or lateral polyether chains.

16. The coating of claim 15 wherein said polyisocyanate adduct has aliphatically and/or cycloaliphatically bound isocyanate groups.

17. The coating of claim 15 wherein said polyisocyanate contains isocyanurate groups and is prepared from 1,6-hexamethylene diisocyanate.

18. A coating which is prepared from a two-component, aqueous polyurethane coating composition which may be cured at ambient temperature and which contains I) an isocyanate-reactive component comprising
   A) an aqueously dispersed polyurethane wherein said polyurethane has
      a) an average hydroxy functionality of at least 2 to 8,
      b) a total content of urethane and urea groups, calculated as —NH—CO—, of 9 to 20% by weight, based on the weight of said polyurethane,
      c) 10 to 180 milliequivalents of chemically incorporated anionic groups per 100 g of polyurethane,
      d) 0 to 25% by weight, based on the weight of said polyurethane, of ethylene oxide units incorporated within terminal and/or lateral polyether chains and
      e) a hydroxy equivalent weight of 500 to 4000,
      wherein c) and d) are present in an amount which is sufficient to maintain the polyurethane stably dispersed in water, and
   B) 2 to 20%, based on the weight of components I and II, of a polyol which has a molecular weight of 62 to 250 and may contain ether groups and
II) a water dispersible polyisocyanate wherein said polyisocyanate is based on the reaction product of a polyisocyanate adduct and has
   a) an isocyanate content of 10 to 25% by weight, based on the weight of the polyisocyanate,
   b) an average functionality of at least 2.5 to 6,
   c) 0 to 200 milliequivalents of chemically incorporated anionic groups per 100 g of polyisocyanate and
   d) 2 to 15% by weight, based on the weight of said polyisocyanate, of ethylene oxide units incorporated within terminal and/or lateral polyether chains,
   wherein c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

19. The coating of claim 18 wherein said polyisocyanate adduct has aliphatically and/or cycloaliphatically bound isocyanate groups.

20. The coating of claim 18 wherein said polyisocyanate contains isocyanurate groups and is prepared from 1,6-hexamethylene diisocyanate.

* * * * *